US005922148A

United States Patent [19]
Irvine et al.

[11] Patent Number: 5,922,148
[45] Date of Patent: Jul. 13, 1999

[54] ULTRA LOW SULFUR SUPERALLOY CASTINGS AND METHOD OF MAKING

[75] Inventors: Jeffrey D. Irvine, Chippewa Falls, Wis.; Russell G. Vogt, Yorktown, Va.; Donald L. Bierstine, Newton, N.J.; Christine M. Stabile, Rockaway, N.J.; John R. Mihalisin, N. Caldwell, N.J.; Jeffery S. Smith, Norton Shores, Mich.; John P. Kunkle, Flanders, N.J.; Gail R. Cole, Muskegon; Thomas W. Nielsen, Whitehall, both of Mich.

[73] Assignee: Howmet Research Corporation, Whitehall, Mich.

[21] Appl. No.: 08/805,801

[22] Filed: Feb. 25, 1997

[51] Int. Cl.$^6$ ........................................... C22C 1/02
[52] U.S. Cl. .................. 148/555; 164/122.1; 164/122.2; 164/55.1; 164/56.1
[58] Field of Search .................. 420/441, 442, 420/443, 444, 445, 446, 447, 448, 449, 450, 451, 452, 453, 454, 455, 456, 457, 458, 459, 460, 590; 164/122.1, 122.2, 55.1, 56.1; 148/555, 556

[56] References Cited

U.S. PATENT DOCUMENTS

| | | |
|---|---|---|
| 934,278 | 9/1909 | Browne . |
| 1,410,749 | 3/1922 | Hadfield . |
| 3,212,881 | 10/1965 | Dunn et al. . |
| 3,551,137 | 12/1970 | Bhat et al. . |
| 3,598,170 | 8/1971 | Roberts ................................ 164/122.1 |
| 3,853,540 | 12/1974 | Schlatter et al. ............................ 75/53 |
| 4,456,481 | 6/1984 | McGinniss ............................... 420/443 |
| 4,484,946 | 11/1984 | Otatani ......................................... 75/82 |
| 4,719,080 | 1/1988 | Duhl et al. ............................... 420/443 |
| 4,826,738 | 5/1989 | Smeggil ................................... 420/442 |
| 4,895,201 | 1/1990 | DeCrescente et al. ............... 164/122.1 |
| 5,335,717 | 8/1994 | Chin et al. ............................... 164/519 |
| 5,344,510 | 9/1994 | Allen et al. .............................. 148/428 |
| 5,346,563 | 9/1994 | Allen et al. .............................. 148/675 |
| 5,538,796 | 7/1996 | Schaffer et al. ......................... 148/675 |
| 5,673,745 | 10/1997 | Jackson et al. ......................... 148/404 |
| 5,676,191 | 10/1997 | Bewlay et al. .......................... 148/404 |

FOREIGN PATENT DOCUMENTS

| | | |
|---|---|---|
| 0451385 | 10/1991 | European Pat. Off. . |
| 296112 | 8/1928 | United Kingdom . |
| 10352507 | 7/1966 | United Kingdom . |
| 2174716 | 11/1986 | United Kingdom ................... 420/435 |

OTHER PUBLICATIONS

Specialty Minerals Inc.—Technical Data, 1993.
Metal Alloys Index 96(5):43–162 of "Processing of Revert Materials in the Precision Casting Industry" in Tekhnologiya Legikikh (May 1992).
Metal Alloys Index 85(6):42–804 of "Vacuum Recycling Effect on Minor Elements in Superalloys" in AGARD, 16.1–16.2, Apr. 1984.
Metal Alloys Index 93(1):42–69 of "The Effects of Electron Beam Refining on the Castability of IN–713C" in Metall 443–447, May 1992.

*Primary Examiner*—Deborah Yee

[57] ABSTRACT

Directionally solidified superalloy components having a bulk sulfur concentration of less than 1 part per million by weight are provided by vacuum melting a charge to form a superalloy melt, desulfurizing the melt by contact with a calcium-bearing desulfurizing agent for a time to reduce sulfur concentration of the melt to less than 1 ppm by weight, casting the melt directly or following solidification and remelting in a ceramic investment mold, and directionally solidifying the melt as cast components without adverse bulk sulfur pick-up subsequent to desulfurization to provide castings having a sulfur content below 1 ppm, such as in the range of hundreds of parts per billion to provide significantly improved oxidation resistance.

24 Claims, 2 Drawing Sheets

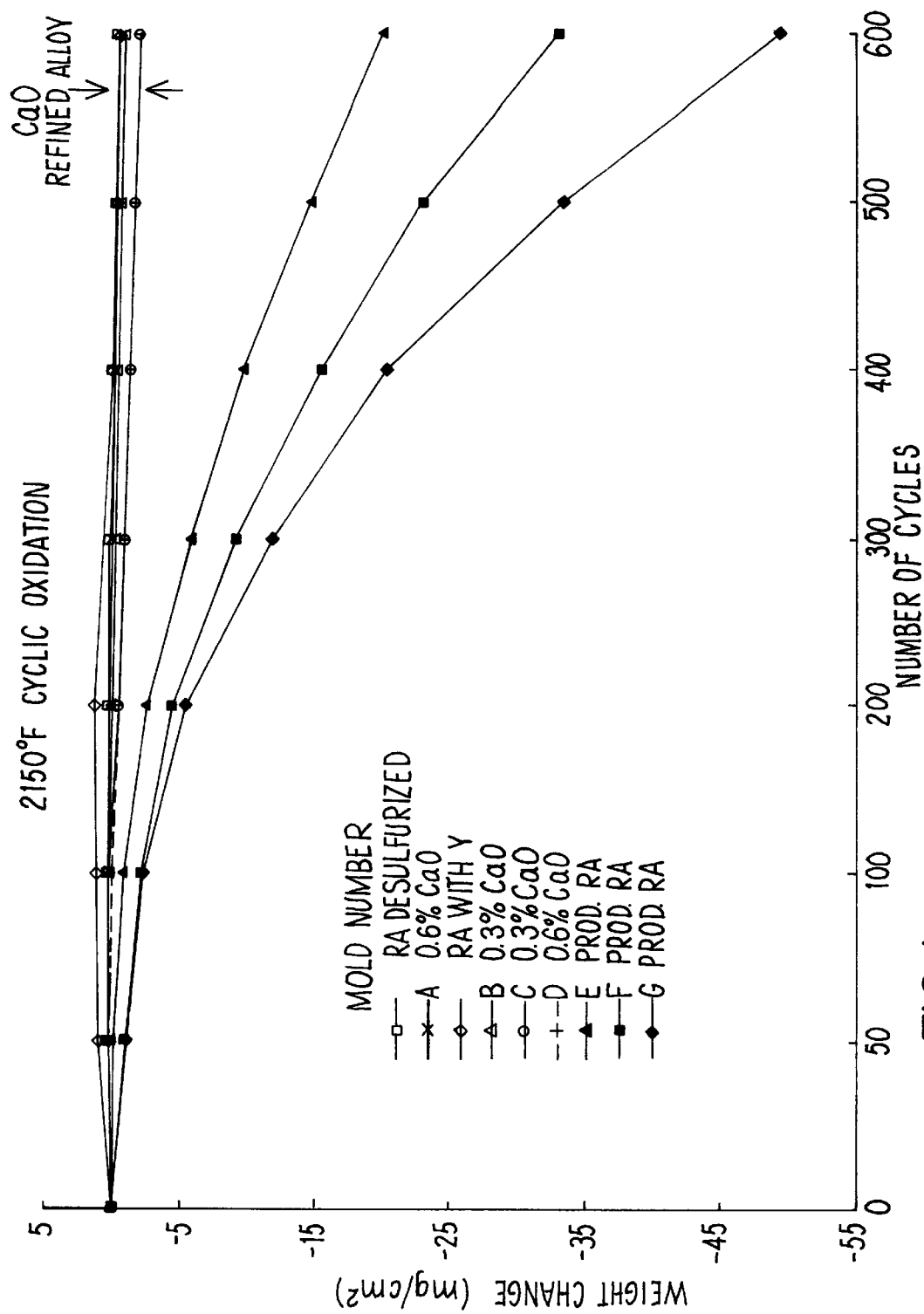

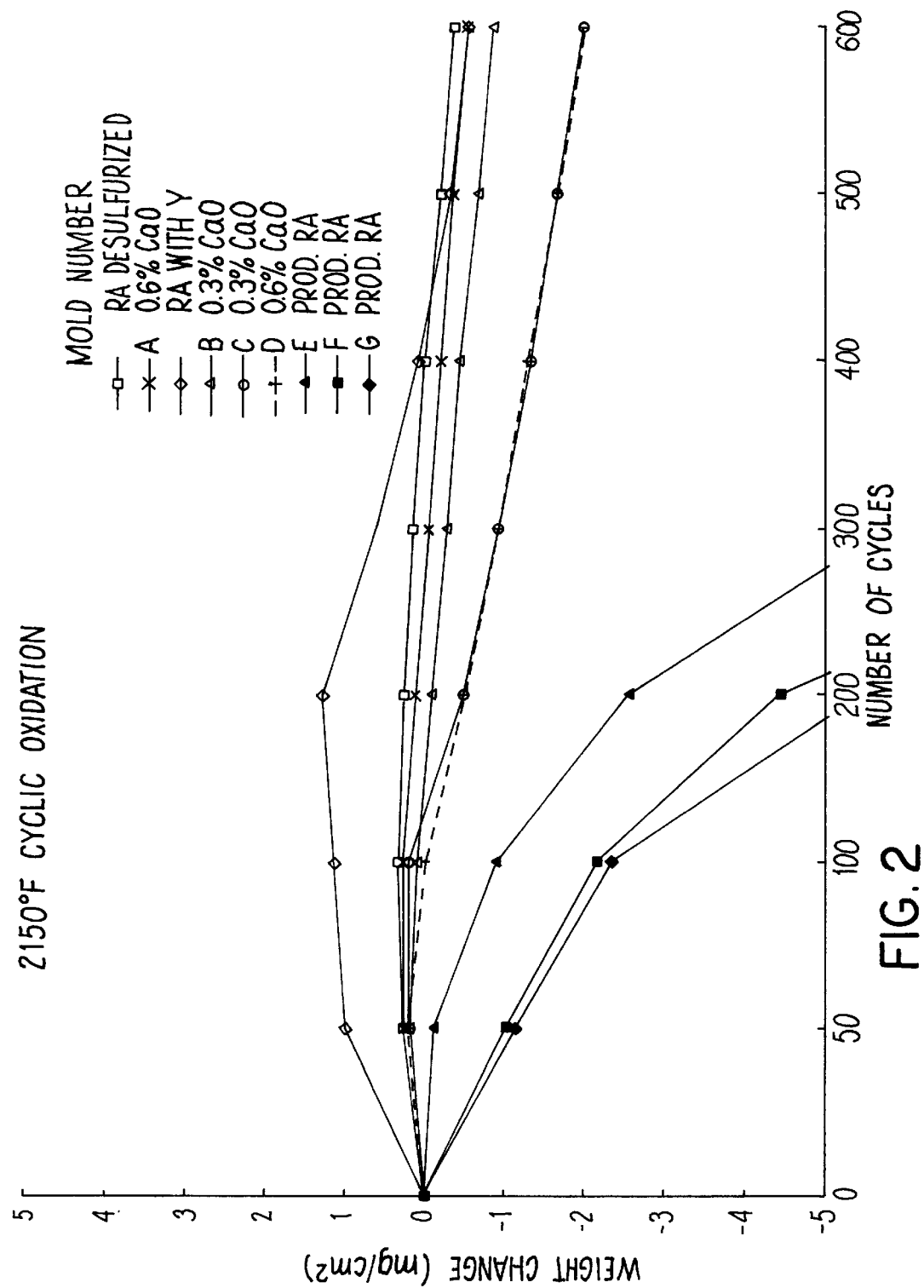

ULTRA LOW SULFUR SUPERALLOY CASTINGS AND METHOD OF MAKING

FIELD OF THE INVENTION

The present invention relates to superalloy castings having substantially improved oxidation resistance and, more particularly, to superalloy castings and methods of making same having ultra low sulfur contents of less than 1 part per milllion by weight, typically in the hundeds of parts per billion by weight, in the as-cast condition.

BACKGROUND OF THE INVENTION

Superalloys are widely used as castings in the gas turbine engine industry for critical components, such as turbine blades and vanes, subjected to high temperatures and stress levels. Such critical components oftentimes are cast using well known directional solidification (DS) techniques that provide a single crystal or columnar grain microstructure to optimize properties in a particular direction.

Directional solidification casting techniques are well known wherein a nickel base superalloy remelt ingot is vacuum induction remelted in a crucible in a casting furnace and poured into a ceramic investment cluster mold disposed in the furnace having a plurality of mold cavities. The nickel base superalloy remelt ingot has been produced in the past by vacuum induction melting of elemental alloy charge components in a basic refractory lined (e.g. MgO lined) crucible or vessel. The superalloy melt is poured from the vessel onto a ceramic (e.g. alumina) tundish which includes multiple ceramic filters to remove oxide and other particles (dross) that could form inclusions in the castings.

The filtered melt is cast into steel ingot molds to produce relatively large (e.g. 100 pound) cylindrical ingots which are surface ground and end cropped or trimmed to remove pipe shrinkage at the upper end of the ingot. The ingot then is cut or sectioned to smaller remelt ingot sizes for remelting in the DS casting furnace.

During directional solidfication, the superalloy melt is subjected to unidirectional heat removal in the mold cavities to produce a columnar grain structure or single crystal in the event a crystal selector or seed crystal is incorporated in the mold cavities. Uidirectional heat removal can be effected by the well known mold withdrawal technique wherein the melt-filled cluster mold on a chill plate is withdrawn from the casting furnace at a controlled rate. Alternately, a power down technique can be employed wherein induction coils disposed about the melt-filled cluster mold on the chill plate are deenergized in controlled sequence. Regardless of the DS casting technique employed, generally unidirectional heat removal is established in the melt in the mold cavities.

Such melting and DS casting processes typcially have produced DS nickel base superalloy castings, such as high volume production turbine blade castings, having bulk sulfur impurity concentrations in the range of 2 to 10 parts per million (ppm) by weight. Such sulfur impurity levels have been thought to have an adverse effect on high temperature oxidation resistance of nickel base superalloys in service, especially as engine operating temperatures have increased.

One approach in past superalloy development to counter adverse effects of sulfur impurities on superalloy oxidation resistance has involved development of superalloy compositions modified by inclusion of a small but effective amount of an active element, such as yttrium, to improve oxidation resistance by improving stability of the alumina protective oxide that forms at the high temperatures of turbine service. Such active elements are thought to reduce the deleterious effect of sulfur impurities in the alloy composition on the protective alumina scale or layer. In particular, the presence of such active elements is observed to reduce spallation of the alumina protective layer and thus to improve oxidation resistance.

Another approach in such superalloy development has involved heat treatment of superalloy castings in a manner to reduce the sulfur concentration to low levels that provide improved oxidation resistance. For example, U.S. Pat. No. 5,346,563 describes a post-casting heat treatment for reducing sulfur levels to below 5 parts per million by weight by heat treatment at elevated temperature in the presence of MgO and other enumerated foreign chemcial species effective to alter the oxide layer to allow sulfur egress from the alloy. Examples set forth in the '563 patent involve heat treating single crystal nickel base superalloy turbine blade castings having an initial sulfur level in the range of 8 to 10 ppm by weight to achieve a reduced sulfur concentration of less than 1 ppm in the airfoil portion of castings as measured by glow discharge mass spectroscopy (GDMS) and substantilly improved oxidation resistance. However, the post-casting heat treatment involves long times (e.g. 50–100 hours) in the presence of the foreign chemical species (e.g. MgO) and thus is disadvantageous from manufacturing complexity, time and cost standpoints.

What is still needed is a method of making superalloy castings, particularly DS single crystal and columnar grain superalloy castings for gas turbine engines, having ultra low sulfur concentrations such that the cast components exhibit substantially improved oxidation resistance comparable to that of the aforementioned superalloys bearing yttrium or other active elements and the aforementioned specially heat treated superalloy castings.

What is also still needed is a method of making superalloy castings having such ultra low sulfur concentrations on a reliable, consistent basis from one casting to the next in a high volume industrial production environment or operation.

SUMMARY OF THE INVENTION

The present invention provides a method of making superalloy cast components having ultra low sulfur concentrations, as well as ultra low sulfur cast superalloy components, that satisfy these needs. An embodiment of the method of the present invention involves forming a superalloy melt, contacting the melt and a desulfurizing agent, such as for example a calcium-bearing desulfurizing agent, for a time to reduce sulfur concentration in the melt to less than 1 part per million (ppm) by weight, casting the melt (directly or after remelting) in a mold, and solidifying the melt in the mold as cast components, without adverse sulfur pick-up by the melt after desulfurization, such that the cast components exhibit a sulfur concentration less than 1 ppm by weight, preferably in the hundreds of parts per billion (ppb) by weight, such as for example 300 ppb sulfur. The cast component may be subjected to an optional relatively short time heat treatment in a hydrogen atmosphere sans foreign chemical species (e.g. MgO medium) to reduce or remove any surface sulfur present at a surface of the cast component.

The cast superalloy components of the present invention, such as columnar grain or single crystal cast components as well as equiaxed grain components, have sulfur concentrations less than 1 ppm by weight in as-cast condition to substantially improve oxidation resistance of the components. Generally, the cast components of the invention exhibit oxidation resistance comparable to that exhibited by superalloy castings including yttrium or other active element additions or subjected to special long time heat treatments in the presence of a foreign chemical species (e.g. MgO medium).

Other advantages, features, and embodiments of the present invention will become apparent from the following description taken with the following drawings.

DESCRIPTION OF THE DRAWINGS

FIG. 1 is a graph of weight change versus number of cycles for the cyclic oxidation test coupons or specimens listed in the figure.

FIG. 2 is a graph based on FIG. 1 of weight change versus number of cycles with the weight change scale enlarged to further illustrate differences between the test coupons or samples listed.

DESCRIPTION OF THE INVENTION

The present invention is directed to superalloy castings and methods of making them to have ultra low sulfur concentrations to substantially improve oxidation resistance. The term superalloy is used in this application in conventional sense and describes the class of alloys developed for use in high temperature environments and typically having a yield strength in excess of 100 ksi at 1000 degrees F. Representative of such class of alloys include the nickel base superalloys, many of which contain aluminum in an amount of at least about 5 weight % as well as one or more of other alloying elements, such as titanium, chromium, tungsten, tantalum, etc. and which are strengthened by solution heat treatment. Such nickel base superalloys are described in U.S. Pat. No. 4,209,348 to Duhl et al. and U.S. Pat. No. 4,719,080 to Duhl et al, the teachings of which are incorporated herein by reference. Referred to hereafter as the Reference Alloy in illustrative examples of practicing the present invention is a commercially produced single crystal nickel base superalloy having the nominal composition, in weight %, of 10% Co, 8.7% Ta, 5.9% W, 5.7% Al, 5.0% Cr, 3.0% Re, 1.9% Mo, 0.1% Hf, balance Ni. Other nickel base superalloys are known to those skilled in the art and are described in the book entitled "Superalloys II" Sims et al., published by John Wiley & Sons, 1987.

The method of the present invention is useful in making cast nickel base superalloy components in a high volume production environment wherein the cast components prior to heat treatment consistently from one cast component to the next have bulk sulfur contents less than 1 ppm by weight. One embodiment of the present invention involves vacuum induction melting a solid charge of nickel base superalloy components in appropriate proportions to form a nickel base superalloy melt having a desired alloy composition. The nickel base superalloy components can comprise solely virgin raw materials of each or combined alloy components, such as elemental nickel, elemental aluminumm, elemental chromium, etc. and the like as well as alloys. Importantly, the grade of the aluminum alloy component material and the grade of the chromium alloy component material preferably each are selected to include sulfur in amounts less than 10 ppm by weight, other alloy component materials having been found to be substantially less important or non-contributors to sulfur in the casting.

Importantly, in the practice of an embodiment of the present invention, the alloy charge components to be melted can comprise a large percentage, such as about 40% by weight or more, of revert superalloy material of the same or compatible composition to that desired. Revert superalloy material comprises scrap castings as well as waste gating, root sections and other superalloy material trimmed or otherwise removed from previous finished superalloy castings during their manufacture. Revert material typically includes a relatively high bulk sulfur concentration in the range of 2 to 10 ppm by weight. The present invention is advantageous and yields the surprising result that such revert material can be used as a large percentage of the charge and still produce ultra low sulfur cast superalloy components. For example, at least about 40% by weight of the alloy charge components initially melted can comprise such revert superalloy material with the balance being virgin materials.

Typically, certain solid alloy charge components of the nickel base superalloy initially are placed as a base charge in a basic refractory lined melting vessel, such as a MgO lined crucible, in a melting chamber that can be evacuated to about 2 to 10 microns during the melting operation. The solid base charge components preferably are melted by induction heating coils disposed about the vessel to generate stirring of the melted materials and improved contact between the desulfurization agent provided in the melt. The vacuum level typically is maintained at about 10 microns initially and then drops to about 2 microns generally less than 5 microns near the end of the melting operation.

Some superalloy components, such as elemental Ni, Co, Mo, Re, C, and W for the superalloys identified in the Examples, are present in the base solid charge which is initially melted by induction heating followed by sequential additions of such components as elemental Cr and Ta, then revert charge material to be melted, and then such reactive elements as elemental Al and Hf to form the desired melt composition.

A calcium-bearing desulfurization agent preferably is provided as a solid component of the base charge mentioned hereabove to contact the melt on melting of the charge components. For example, a quicklime desulfurization agent described herebelow can be provided as granules or other particulates wrapped in nickel foil and buried beneath the base charge components in the melting crucible. On the other hand, calcium-nickel binary alloy desulfurization agent described herebelow can be provided as granules or other particulates mixed with the base charge components in the melting crucible. However, the invention also can be practiced with addition of the desulfurization agent to the base charge components after they are initially melted; e.g. at the time when the revert is added to the melted base charge or at other times when a melt is already formed.

The calcium-bearing desulfurization agent preferably comprises granular calcium oxide (CaO), particularly as metallurgical grade quicklime comprising at least 96% by weight CaO and sized such that 98% of the granules is retained on 100 mesh sieve. A metallurgical grade quicklime useful in practicing the present invention is available from Specialty Minerals Inc., 540 North 13th Street, Easton, Pa. under the designation QUICKLIME-METALLURGICAL GRADE.

Also useful as the calcium-bearing desulfurization agent is dolomitic lime which comprises approximately 50% by weight CaO, 50% by weight MgO.

The calcium-bearing desulfurization agent also can comprise a granular calcium binary alloy, particularly a granular calcium-nickel binary alloy (6 weight % Ca and balance Ni) and having a granule size of 2 inches under the designation Inocal/10.

The nickel base superalloy melt and the calcium-bearing desulfurizing agent in sufficent quantity are contacted or reacted in the melting crucible or vessel for a time to reduce sulfur concentration of the melt to less than 1 ppm by weight, typically in the hundreds of parts per billion range, such as 300 ppb sulfur, as will become evident hereafter. The time of contact will vary with the amount of melt to be treated and its initial sulfur content. For purposes of illustration and not limitation, the Reference Alloy (nominal composition set forth above) nickel base superalloy melt weighing 100 pounds and 0.6 weight % CaO (metallurgical grade quicklime) were contacted for a time of 2 hours while the melt was vacuum induction stirred in a MgO melting vessel (pot) as set forth in the Examples below.

The quantity of calcium-bearing desulfurizing agent present generally will depend on the sulfur content of the nickel base superalloy melt in order to reduce the sulfur level to less than 1 ppm by weight. In the Examples set forth below, 0.3 weight % (3000 ppm) and 0.6 weight % (6000 ppm) of the aforementioned metallurgical grade quicklime were provided in each 100 pound Reference Alloy melt to reduce sulfur to less than 1 ppm by weight having initial sulfur from 2 to 4 ppm by weight. The higher amount of metallurgical grade quicklime produced the lowest bulk sulfur levels in the melt and resulted in the greatly improved oxidation resistance of the castings made therefrom as will become evident. The calcium-bearing desulfurizing agent in general is present in an excess of the stoichiometric amount needed to reduce sulfur to less than 1 ppm by weight, with the proviso that the calcium concentration of the melt as well as of the cast components does not exceed about 20 ppm by weight.

The desulfurization reaction products (Ca/Mg sulfides and/or oxysulfides) and remnant, unreacted calcium-bearing desulfurization particles are removed from the melt by adhering to the walls of the crucible, floating and adhering to walls of a tundish onto which the melt is poured from the crucible, adhering to melt filters on the tundish, and floating to the top of the melt in a master ingot mold into which the melt is cast and solidified. The top of the solidified master ingot is cropped or removed prior to ingot remelting and casting into a preheated ceramic investment shell mold in conventional manner.

The ceramic investment shell cluster mold can comprise a conventional mold configuration used for casting nickel base superalloys. Such molds include a pour cup and gating system to direct the melt to a plurality of indiviudal mold cavities having the shape of the component to be cast. The mold typically includes a ceramic facecoat which contacts the superalloy melt and which can be selected from yttria, zirconia, zircon, and other ceramic facecoat materials that are substantially non-reactive with the melt and applied as multiple slurry layers with a suitable binder and dried. The facecoat is backed by multiple ceramic back-up layers which typically comprise alternating layers of appropriate ceramic slurry and ceramic stucco with a suitable binder, the ceramic being selected from zirconia, zircon, alumina, magnesia, yttria and other commonly used back-up layer ceramic materials, such facecoat and back-up ceramic materials and binders being described in U.S. Pat. No. 5,335,717, the teachings of which are incorporated by reference herein to this end.

Remelt ingots of appropriate weight are placed in a magnesia, zirconia, or other ceramic remelt crucible in a casting furnace and induction heated by induction coils about the remelt crucible to melt the remelt ingot and heat the melt to a suitable superheat for casting into the cluster mold disposed below the crucible in the casting furnace. The remelt is lip poured, bottom poured or otherwise cast from the remelt crucible into the preheated cluster mold below the crucible. The melt in the mold then is directionally solidified pursuant to the withdrawal technique, power down technique, or other directional solidification technique as described for example in numerous U.S. Pat. Nos. 2,594,998; 3,260,505; 3,494,709; 3,931,847; 4,964,453; 5,197,847; 5,484,008, the teachings of which are incorporated herein by reference to this end, and others to produce directionally solidified cast components in the mold cavities of the cluster mold.

Alternately, the invention envisions pouring the superalloy melt from the melting vessel onto the tundish and directly into a suitable ceramic mold for solidification to form cast components in the mold. That is, the formation of a master ingot and remelting of a portion of the master ingot in the casting furnace can be avoided in practicing an embodiment of the invention.

Following contact between the nickel base superalloy master melt and desulfurizing agent in the melting vessel as described hereabove, adverse sulfur pick-up by the superalloy melt, master ingot, and remelt ingot and melt is avoided such that the cast components in the cluster mold still exhibit a sulfur concentration less than 1 ppm by weight. For example, exposure of the master melt, ingot and remelt to potential sources of sulfur is minimized to maintain a bulk sulfur concentration of less than 1 ppm by weight in the cast components after cleaning of the casting before any post casting heat treatment. For example, exposure to potential sources of sulfur are minimized by using low sulfur raw charge components and low sulfur refractory furnace, tundish, and ingot mold materials used in forming the superalloy master melt and master ingot and in carrying out the remelt, casting, and post-casting operations. In the remelt and casting operations, low sulfur crucible, furnace refractory and graphite materials and vacuum pump oils in the casting furnace can be used to this end. Similarly, post-casting operations can use low sulfur heat treatment furnace liners and abrasive casting finishing materials such as cut-off wheels, belts, grit, cleaning media and the like.

Measurement of sulfur concentrations less than 1 ppm by weight in the master melt and cast components as described herein can be conducted using glow discharge mass spectroscopy anaylsis available from independent testing laboratory, Northern Analytical Laboratory, Inc., 23 Depot Street, Merrimack, N.H., and other testing sources, or using combustion analysis with a LECO model CS 444LS combustion analyzer available from Leco Corporation, St. Joseph, Mich., although other analysis techniques may be known by those skilled in the art.

As will become apparent from the Examples herebelow, cast components having bulk sulfur concentration less than 1 ppm exhibit substantially improved oxidation resistance in cyclic oxidation tests.

EXAMPLES

The following examples involved melting and casting the Reference Alloy nickel base superalloy whose nominal composition is described above.

Master ingots of the Reference Alloy nickel base superalloy were made by vacuum induction melting under less than 20 microns vacuum a base charge comprising virgin elemental Ni, Co, Mo, Re, C, W in an MgO lined melting crucible followed by sequential additions of elemental Cr and Ta, then revert charge material comprising the Reference Alloy material, and then such reactive elements as elemental Al, Hf, and Y when present to form the desired melt composition for the Reference Alloy or a similar alloy with yttrium addition (see Table II). The revert charge component comprised 60% by weight (heats 1–4) or 40% by weight (heats 5–6) of the overall charge weight with the balance being essentially the virgin elemental charge components. The virgin charge components were estimated to include less than approximately 1 ppm by weight sulfur while revert material was estimated to include about 2 to 4 ppm by weight sulfur.

Metallurgical grade quicklime (QUICKLIME-METALLURGICAL GRADE described hereabove) was included as part of the base charge in making certain master ingots. When present, granules of the QUICKLIME-METALLURGICAL GRADE were wrapped in Ni foil and located beneath the base charge components in the MgO melting crucible. When the aforementioned Ca—Ni alloy was used, granules thereof were mixed with the base charge components in the MgO melting crucible.

Induction coil heating was initiated to melt the base charge components and to heat the melt to desired temperature for pouring. Each Reference Alloy melt was induction heated for approximately 2 hours and then poured at a temperature of 2800 degrees F. onto an alumina tundish for flow past a tundish wier and through a cylindrical porous alumina filter having a pore size of 5 pores per inch (average pore size opening of 80 mils). Each melt was directed into a cylindrical steel ingot mold and solidified therein under less than 5 microns vacuum to form a master ingot 3½ inches in diameter and 3 feet long and weighing 100 pounds.

Each master ingot was surface ground by stone grinding media to a depth of ⅛ inch, and the lower end of the ingot was abrasive belt ground. The upper end of the ingot was cropped or trimmed to remove pipe shrinkage extending into the upper end of the ingot. The pipe shrinkage typically extended 3–4 inches into the upper end of the ingot and was trimmed off. Each surface ground, trimmed master ingot then was cut into appropriate smaller remelt ingots appropriate for remelting as a 17 pound charge in magnesia crucibles (e.g. mold # C,E,G of Table II) or zirconia crucibles (e.g. mold # A,B,D,F of Table II) for vacuum casting under less than 5 microns vacuum at a superheat (alloy melting temperature plus 350 degrees F.) into respective preheated (2775 degrees F.) ceramic investment shell cluster molds having diffferent facecoats (i.e. zircon, zirconia, and yttria described below). Each cluster mold included 32 mold cavities each bottom fed with melt through an porous alumina filter having pore size of 30 pores per inch. Each mold was withdrawn from the casting furnace at a rate to produce single crystal rectangular shaped test bars that were 7 inches in length, 1 inches in width, and 0.080 inch in thickness.

The cast single crystal test bars were cleaned by conventional caustic leaching to remove remnant mold material and then heat treated at different post cast solution heat treatments (i.e. 2 and 5 hours in hydrogen atmosphere between 2300–2400 degrees F. or 2 hours at the same temperature in argon atmosphere).

Referring to Table I herebelow, four master heats 1–4 of the Reference Alloy nickel base superalloy treated with the chemical grade quicklime (CaO) agent and two master heats 5–6 treated with the Ni—Ca agent were analyzed for sulfur by a LECO 444LS combustion analyzer. Such analysis showed that sulfur levels in these master heats generally ranged from 1.0 ppm to 0.6 ppm by weight. Generally, the GDMS measurement technique is considered to be more accurate than the LECO 444LS at less than 1 ppm sulfur.

The master heat samples analyzed by the aforementioned independent testing laboratory using the GDMS technique reported sulfur levels to be 0.3 ppm by weight for each heat as shown in Table I based on multiple measurements of samples. Based on the GDMS tests, the sulfur concentration in the master heat samples treated pursuant to the invention with chemical grade quicklime is less than 1 ppm by weight S and preferably between about 0.3 to about 0.6 ppm by weight S.

TABLE I

| Master Heat | CaO/Ni—Ca Add (wt. %) | S-LECO (ppm) | Ca (ppm) | S-GDMS Method (ppm) |
| --- | --- | --- | --- | --- |
| 1 | 0.3 | 0.7 | 4 | 0.3 |
| 2 | 0.3 | 0.8 | 3 | 0.3 |
| 3 | 0.6 | 0.6 | 0 | 0.3 |
| 4 | 0.6 | 0.7 | 0 | 0.3 |
| 5 | 0.6 | 0.7 | 0 | — |
| 6 | 0.3 | 1.0 | 0 | — |

Master heats 1–4 were made using CaO desulfurizing agent with a 60% by weight revert charge component and balance (40% by weight) virgin components, while heats 5–6 were made using Ni—Ca desulfurizing agent with 40% by weight revert charge component and balance (60% by weight) virgin components. The sulfur contents of the master heats made using these revert charge components was unexpectedly and surprisingly low given the relative high sulfur levels of the revert charge material used as a charge component.

From each mold cast of the CaO desulfurized master melts, two test coupons (1 inch by 1 inch by 0.080 inch thick) were removed from two different test bars for cyclic oxidation testing, making a total of four (4) cast coupons for cyclic oxidation testing at 2150 degrees F. out to 600 cycles (1 cycle=50 minutes in furnace followed by a 10 minute air cool).

Oxidation data and chemical analysis data from cast and heat treated Reference Alloy test coupons are shown in Table II. Coupons of molds A, B, C, D, were representative of the invention using CaO desulfurization of the Reference Alloy master melt as described above. Molds E, F, G were made without desulfurization of the Reference Alloy master melt for comparison.

TABLE II

| Mold # | CaO wt. % | Heat Treat | S (ppm) | C (ppm) | Ca (ppm) | 600 Cycle Oxidation (mg/cm$^2$) |
| --- | --- | --- | --- | --- | --- | --- |
| A | 0.6 | H$_2$-5 hr | 0.2 | 236 | 10 | −0.56 |
| B | 0.3 | H$_2$-5 hr | 0.2 | 248 | 10 | −0.87 |
| C | 0.3 | Ar-2 hr | 0.2 | 276 | 10 | −2.00 |
| D | 0.6 | H$_2$-2 hr | 0.5 | 232 | 10 | −2.02 |
| E | 0 | H$_2$-2 hr | 1.3 | 202 | 10 | −20.01 |
| F | 0 | Ar-2 hr | 1.7 | 306 | 10 | −32.96 |
| G | 0 | Ar-2 hr | 1.3 | 315 | 10 | −49.30 |
| RA Desulfurized | | | | | | −0.38 |
| RA with Y | | | | | | −0.56 |

Table II reveals that the test coupons made pursuant to the invention exhibited extremely low concentrations of Ca. Ca contents generally did not exceed 10 ppm by weight. In Table II, the bulk sulfur levels were measured by LECO 444LS combustion analyzer and were at ultra low levels less than 1 ppm by weight sulfur. The cast coupons prior to heat treatment would have like or similar ultra low bulk sulfur levels less than 1 ppm by weight sulfur since the relatively short time at temperature of the heat treatments is insufficient to affect bulk sulfur level of the castings, although any surface sulfur that may be present can be removed from casting surfaces by the short time hydrogen heat treatments. In Table II, the test coupons are listed in order of oxidation resistance from the best performing alloy (mold # A) to worst performing alloy (mold # G).

The cyclic oxidation graph of FIG. 1 shows dramatic improvements obtained with test coupons made by addition of metallurgical grade quicklime CaO to the Reference Alloy master melt pursuant to the invention. Coupons of mold A and B were significant in that their cyclic oxidation resistance was comparable to that exhibited by a commercial heat treated Y-bearing single crystal Ni base superalloy (designated RA with Y in Table II and figures) having a similar composition as the Reference Alloy with nominal 0.022% by weight Y and significantly better than coupons of molds E, F and G (also designated Prod. RA in the figures). The coupons of molds E, F, and G comprised the Reference Alloy made as described above without desulfurization of the master melt and with the heat treatments indicated in Table II. Coupons or specimens of molds C and D likewise exhibited significantly better oxidation resistance than the coupons of molds E, F, and G, although somewhat less than that of the coupons of molds A and B probably due to differences in heat treatment parameters used as indicated in Table II as well as in mold facecoat materials used (e.g. zironia facecoat for molds C and D and zircon facecoat for mold A, and yttria facecoat for mold B). As is apparent by comparison of the oxidation resistance of coupons of molds A, B, C, D made with different mold facecoats to the oxidation resistance of coupons of mold E (yttria facecoat) and molds F and G (zircon facecoats) and the heat treatment parameters, the desulfurization of the master melt was an overiding or predominant factor among the various factors involved in the Examples in achieving ultra low sulfur levels in the heat treated castings and significant improvements in oxidation resistance thereof.

At 600 cycles, the weight loss of cast test coupons made pursuant to the invention ranged from −0.56 to −2.02 mg/cm$^2$ (miilligram per centimeter squared) as compared to −20.01 to −49.30 mg/cm$^2$ for test coupons made without a quicklime addition to the melt of the Reference Alloy.

FIG. 2 comprises a graph based on FIG. 1 with the weight change scale enlarged showing oxidation resistance of the test coupons made pursuant to the invention compared to the other comparison coupons listed. All of the test coupons of molds A and B made pursuant to the invention using a metallurgical grade quicklime CaO addition to the melt were excellent in oxidation resistance amd comparable to the solid state desulfurized alloy test alloy (RA Desulfurized), which required extremely prolonged heat treatment in the presence of MgO species pursuant to the U.S. Pat. No. 5,346,563.

The present invention provides a method of making superalloy cast components having ultra low sulfur concentrations in the as-cast condition wherein a superalloy melt is formed and contacted with a calcium-bearing or other desulfurizing agent for a time to reduce sulfur concentration in the melt to less than 1 part per million (ppm) by weight, and then cast and solidified in a mold as a cast component, without adverse sulfur pick-up by the melt after desulfurization such that the cast components exhibit substantially improved oxidation resistance in the cylic oxidation test described hererabove. The cast superalloy components exhibit substantially improved oxidation resistance without the need for prolonged heat treatment in the presence of a foreign chemical species such as MgO to remove sulfur. Although the invention has been shown and described with respect to detailed embodiments thereof, it will be understood by those skilled in the art that various changes in form and and detail thereof may be made without departing from the spirit and scope of the claimed invention.

We claim:

1. A method of making cast superalloy components having substantially improved oxidation resistance, comprising melting a charge including at least one of solid virgin charge material and solid revert charge material in a melting vessel to form a superalloy melt, contacting the melt and a desulfurizing agent introduced to said charge before or after said melt is formed for a time to reduce sulfur concentration of said melt in said melting vessel to less than 1 part per million by weight, casting the melt directly, or following solidification and remelting, in a mold to solidify said melt as cast components, such that the components exhibit a sulfur concentration less than 1 part per million by weight.

2. The method of claim 1 wherein said superalloy melt is formed by melting a solid charge under relative vacuum and said desulfurizing agent is included in said charge prior to melting.

3. The method of claim 2 wherein said charge is melted by vacuum induction.

4. The method of claim 1 wherein said superalloy melt is formed by melting a solid charge under relative vacuum and said desulfurizing agent is introduced to said charge after melting.

5. The method of claim 4 wherein said charge is melted by vacuum induction.

6. The method of claim 2 wherein said charge comprises at least 40% by weight of revert superalloy material.

7. The method of claim 6 wherein said charge comprises a majority of revert superalloy material.

8. The method of claim 1 wherein said agent comprises calcium oxide.

9. The method of claim 8 wherein said calcium oxide comprises 96% by weight CaO.

10. The method of claim 1 wherein agent comprises a calcium binary alloy.

11. The method of claim 10 wherein said alloy comprises a calcium-nickel alloy.

12. The method of claim 1 wherein the melt is cast in a ceramic investment mold and solidified therein to produce a directionally solidified grain structure or equiaxed grain structure.

13. The method of claim 1 further including heating the cast components in hydrogen for a time to reduce any sulfur at a surface of the cast components.

14. A method of making a cast nickel base superalloy component having substantially improved oxidation resistance, comprising vacuum induction melting a solid charge of appropriate composition and including revert charge material in a melting vessel to form a nickel base superalloy melt, contacting the melt and a calcium-bearing desulfurizing agent introduced to said charge before or after said melt is formed for a time to reduce sulfur concentration of said melt in said melting vessel to less than 1 part per million by weight, solidifying the melt to form an ingot, vacuum remelting at least a portion of the ingot, casting said at least said portion of said ingot in a ceramic investment mold, and solidifying the melt cast in the mold as said cast component, without substantial bulk sulfur pick-up subsequent to said melting, such that the component exhibits a sulfur concentration less than 1 part per million by weight.

15. The method of claim 14 wherein the melt is filtered to remove calcium-bearing reaction products therefrom prior to solidification as said ingot.

16. The method of claim 14 wherein the melt in the mold is directionally solidified.

17. The method of claim 14 further including heating the cast component in hydrogen for a time to reduce sulfur at a surface of the cast component.

18. The method of claim 14 wherein the revert charge material is present in an amount of at least about 40% by weight of the charge.

19. In a method of making a cast superalloy component, the steps of forming a superalloy melt and contacting the melt and a calcium-bearing desulfurizing agent in a melting vessel for a time to reduce sulfur concentration of said melt to hundreds of parts per billion by weight to substantially improve oxidation resistance of a component cast from said melt directly or indirectly after solidification and remelting.

20. The method of claim 19 wherein said superalloy melt is formed by melting a solid charge under relative vacuum and said desulfurizing agent is included in said charge prior to melting.

21. The method of claim 19 wherein said superalloy melt is formed by melting a solid charge under relative vacuum and said desulfurizing agent is introduced to said charge after melting.

22. The method of claim 19 wherein said charge comprises at least 40% by weight of revert superalloy material.

23. The method of claim 22 wherein said charge comprises a majority of revert superalloy material.

24. The method of claim 19 wherein said agent is selected from calcium oxide or a calcium binary alloy.

* * * * *

UNITED STATES PATENT AND TRADEMARK OFFICE
CERTIFICATE OF CORRECTION

PATENT NO. : 5,922,148
DATED : July 13, 1999
INVENTOR(S) : Jeffrey D. Irvine et al.

It is certified that error appears in the above-identified patent and that said Letters Patent is hereby corrected as shown below:

On the title page, item [56]:

Between listed Patent Documents 3,853,540 and 4,456,481 insert --3,891,425  6/1975  McCarty 75/10.17 --.

Signed and Sealed this

Twenty-ninth Day of February, 2000

Attest:

Q. TODD DICKINSON

Attesting Officer

Commissioner of Patents and Trademarks